United States Patent
Kovach

(10) Patent No.: US 11,076,523 B2
(45) Date of Patent: Aug. 3, 2021

(54) TILLAGE POINT FOR AN AGRICULTURAL IMPLEMENT WITH IMPROVED SHANK PROTECTION

(71) Applicant: CNH Industrial America LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 91 days.

(21) Appl. No.: 16/257,332

(22) Filed: Jan. 25, 2019

(65) Prior Publication Data
US 2020/0236832 A1     Jul. 30, 2020

(51) Int. Cl.
| A01B 15/02 | (2006.01) |
|---|---|
| A01B 15/14 | (2006.01) |
| A01B 13/08 | (2006.01) |
| A01B 49/02 | (2006.01) |

(52) U.S. Cl.
CPC ............ *A01B 15/025* (2013.01); *A01B 13/08* (2013.01); *A01B 15/14* (2013.01); *A01B 49/02* (2013.01)

(58) Field of Classification Search
CPC ....... A01B 15/025; A01B 13/08; A01B 15/14; A01B 49/02
USPC ........................................ 172/719, 700, 699
See application file for complete search history.

(56) References Cited

U.S. PATENT DOCUMENTS

| | | | | |
|---|---|---|---|---|
| 756,849 A | * | 4/1904 | Gwynes ............... | A01B 15/025 172/700 |
| 916,868 A | * | 3/1909 | Horinek ............... | A01B 15/025 172/699 |
| 1,330,812 A | * | 2/1920 | Lilly .................... | A01B 15/025 172/731 |
| 3,202,222 A | * | 8/1965 | Norris .................. | A01B 15/025 172/177 |
| 3,259,087 A | * | 7/1966 | Horton ................. | A01C 23/025 111/123 |
| 3,268,012 A | * | 8/1966 | Ratkowski ............ | E02F 3/8152 172/700 |
| 3,398,799 A | | 8/1968 | Richey et al. | |
| 4,201,142 A | * | 5/1980 | Stump .................. | A01C 23/025 111/123 |
| 4,269,274 A | | 5/1981 | Robertson et al. | |
| 4,355,589 A | * | 10/1982 | Wetmore ............. | A01C 23/025 111/123 |

(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

A tillage point for an agricultural implement includes a body extending in a lengthwise direction between a tip end and a retention end and in a vertical direction between an upper body surface and a lower body surface, where the body defines a retention slot between the upper and lower body surfaces. Additionally, the tillage point has a fin extending outwardly from the upper body surface in the vertical direction. The fin defines a height in the vertical direction between a base end of the fin positioned adjacent to the upper body surface of the body and a top end of the fin positioned opposite the base end. The fin further defines a lateral width between opposed lateral sides of the fin, where the lateral width of the fin tapers along at least a portion of the vertical height of the fin.

11 Claims, 4 Drawing Sheets

(56) References Cited

U.S. PATENT DOCUMENTS

| | | | |
|---|---|---|---|
| 4,719,862 A * | 1/1988 | Edmisson | A01C 23/025 |
| | | | 111/119 |
| 4,781,253 A | 11/1988 | Cosson | |
| 4,867,248 A * | 9/1989 | Robertson et al. | A01B 15/025 |
| | | | 172/753 |
| 5,165,487 A | 11/1992 | Williams et al. | |
| 5,540,288 A * | 7/1996 | Dietrich, Sr. | A01B 13/08 |
| | | | 172/166 |
| 5,947,209 A * | 9/1999 | Halford et al. | A01B 15/025 |
| | | | 172/714 |
| 6,012,534 A * | 1/2000 | Kovach | A01B 13/08 |
| | | | 172/156 |
| 6,158,523 A | 12/2000 | Gengler et al. | |
| 6,178,900 B1 | 1/2001 | Dietrich, Sr. | |
| 6,443,237 B1 | 9/2002 | Myers et al. | |
| 7,017,675 B2 | 3/2006 | Ankenman et al. | |
| 7,631,701 B2 | 12/2009 | Kromminga et al. | |
| 7,721,815 B2 | 5/2010 | Hoffman et al. | |
| 9,320,189 B2 | 4/2016 | Nance | |
| 9,510,496 B2 | 12/2016 | Kovach et al. | |
| 9,949,421 B2 | 4/2018 | Maenle | |
| 2005/0072345 A1 | 4/2005 | Steinlage et al. | |
| 2006/0231275 A1 | 10/2006 | Bull et al. | |
| 2015/0271984 A1 | 10/2015 | Maenle | |

\* cited by examiner

TILLAGE POINT FOR AN AGRICULTURAL IMPLEMENT WITH IMPROVED SHANK PROTECTION

FIELD OF THE INVENTION

The present subject matter relates generally to agricultural implements, and more specifically, to a tillage point with improved shank protection for use with an agricultural implement.

BACKGROUND OF THE INVENTION

A wide range of agricultural implements have been developed and are presently in use for tilling, cultivating, harvesting, and so forth. Tillage implements, for example, are commonly towed behind tractors and may cover wide swaths of ground that include various types of residue. Such residue may include materials left in the field after the crop has been harvested (e.g., stalks and stubble, leaves, and seed pods). Good management of field residue can increase efficiency of irrigation and improve control of erosion in the field.

Tillers typically include ground-engaging tools, such as shanks and tillage points, configured to condition the soil for improved moisture distribution while reducing soil compaction from such sources as machine traffic, grazing cattle, and standing water. The tillage points are typically replaceable, and various different points may be coupled to the shanks, depending upon the field conditions and the desired results of the tilling operation. In some instances, a shin attachment is attached to the shank above the tillage point to protect the front side of shank that is below ground during the tillage operation. However, the shin attachment may need to be replaced at a different time than the tillage point and therefore can require additional time to install and monitor. Additionally, in recent years, tillage points have been developed that include an integral dorsal fin extending upwardly from the body of the point that serve to replace the separate shin attachments. However, while such integral dorsal fins provide some advantages, improvements and/or advancements in their overall design are still needed to optimize the performance of the fins during a tillage operation. For example, opportunities still exist for improving the effectiveness of current dorsal fins designs with reference to increasing the wear life of shanks and/or enhancing the ability of each fin to divert soil away from its respective shank.

Accordingly, a tillage point having an improved dorsal fin design would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a shank assembly for an agricultural implement having a shank extending lengthwise between a proximal end and a distal end, with the proximal end configured to be coupled to a frame of the agricultural implement. The shank assembly also includes a tillage point coupled to the distal end of the shank. The tillage point has a body extending vertically between an upper body surface and a lower body surface and defining a retention slot between the upper and lower body surfaces, with the distal end of the shank being received within the retention slot. The tillage point further includes a fin extending vertically from the body along a front side of the shank. The fin defines a vertical height between a base end of the fin positioned adjacent to the upper body surface of the body and a top end of the fin positioned opposite the base end. Additionally, the fin further defines a lateral width across the front side of the shank between opposed lateral sides of the fin, where the lateral width of the fin tapers along at least a portion of the vertical height of the fin.

In another aspect, the present subject matter is directed to a tillage point having both a body extending in a lengthwise direction between a tip end and a retention end and in a vertical direction between an upper body surface and a lower body surface. The body defines a retention slot at or adjacent to its retention end and a fin extending outwardly from the upper body surface in the vertical direction. The fin defines a height in a vertical direction between a base end of the fin positioned adjacent to the upper body surface of the body and a top end of the fin positioned opposite the base end. Additionally, the fin further defines a lateral width between opposed lateral sides of the fin, where the width of the fin tapers along at least a portion of the vertical height of the fin.

In a further aspect, the present subject matter is directed to an agricultural implement having a frame configured to be actuated relative to the ground between a raised position and a lowered position, and a shank extending lengthwise between a proximal end and a distal end, with the proximal end configured to be coupled to the frame. Additionally, the implement includes a tillage point coupled to the distal end of the shank. The tillage point includes a body extending vertically between an upper body surface and a lower body surface and defining a retention slot between the upper and lower body surfaces, with the distal end of the shank being received within the retention slot. The tillage point further includes a fin extending vertically from the body along a front side of the shank. The fin defines a vertical height between a base end of the fin positioned adjacent to the upper body surface of the body and a top end of the fin positioned opposite the base end. The fin further defines a lateral width across the front side of the shank between opposed lateral sides of the fin, where the lateral width of the fin tapers along at least a portion of the vertical height of the fin.

These and other features, aspects and advantages of the present invention will become better understood with reference to the following description and appended claims. The accompanying drawings, which are incorporated in and constitute a part of this specification, illustrate embodiments of the invention and together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
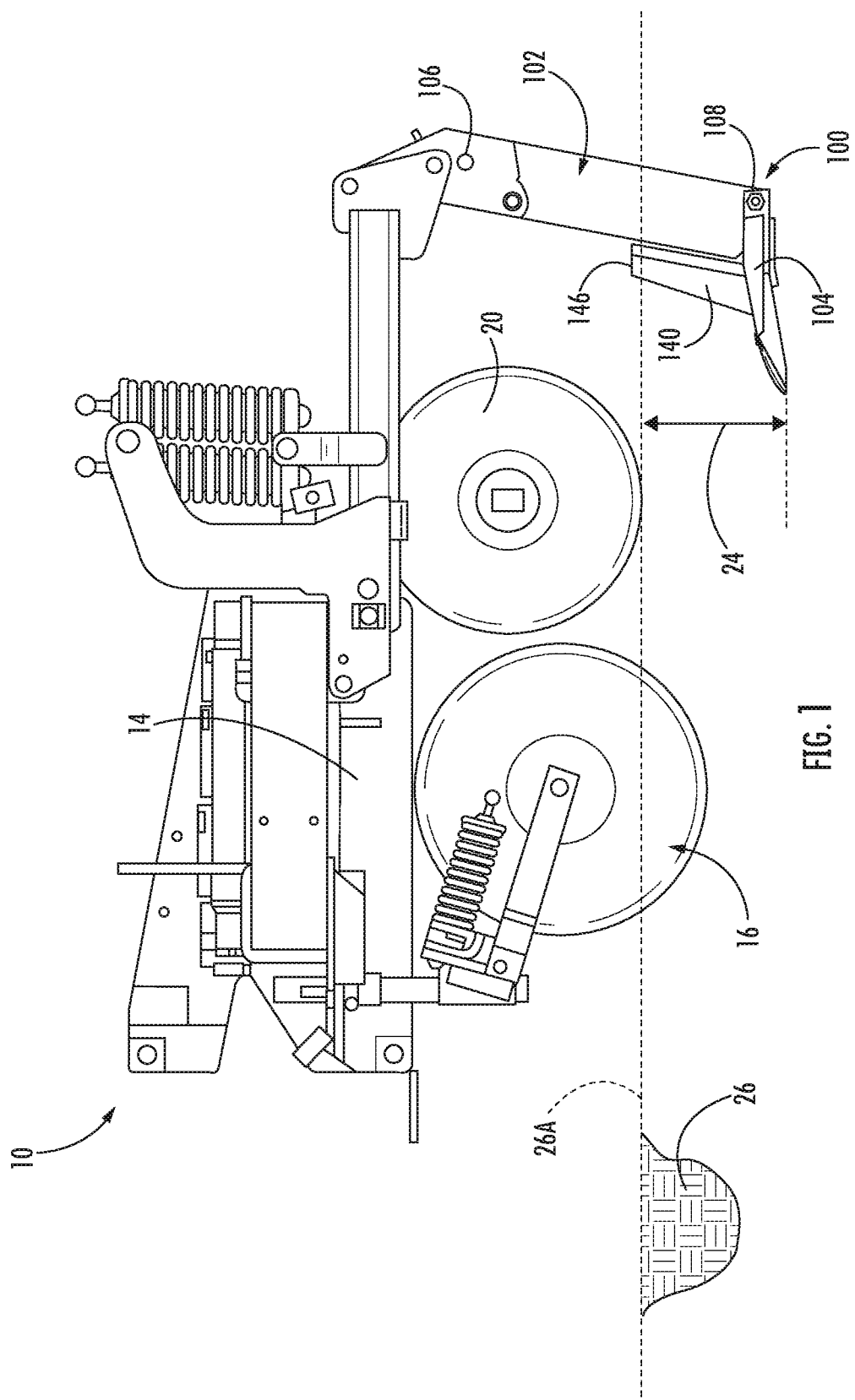
FIG. 1 illustrates a side view of one embodiment of an agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a tillage point configured for use with an agricultural implement that provides improved shank protection. Specifically, in several embodiments, the tillage point may include an integral dorsal fin that is configured to protect an adjacent shank during operation of the agricultural implement by deflecting soil away from the front and sides of the shank. Additionally, in one embodiment, the shape of the dorsal fin may be adapted to deflect the soil away from the shank while leaving a significant portion of the surface residue undisturbed.

For example, in accordance with aspects of the present subject matter, an agricultural implement may include a plurality of shank assemblies, with each shank assembly including a shank and a tillage point configured to be coupled to a distal end of the shank. In several embodiments, the tillage point may generally include a body and a fin projecting outwardly from an upper surface of the body such that the fin extends adjacent to a lower portion of the shank. The fin may generally extend vertically between a base end positioned at the upper surface of the body and a top end opposite the base end, and may define a height between its base and top ends. Additionally, the fin may define a width between opposed sides of the fin, and a length between opposed ends of the fin (e.g., a leading end and a trailing end). In several embodiments, the width of the fin at its trailing end may generally be wider than a width of the shank and may taper along at least a portion of the height of the fin. For example, the width of the fin may taper along the height of the fin such that the width at the base end of the fin is greater than the width at the top end of the fin. Such a tapering lateral profile may allow the fin to have an increased width at or adjacent to its base end to provide maximum protection to the shank while having a smaller width at or adjacent to its top end to minimize the disturbance to the surface residue. Further, in some embodiments, the width of the fin may taper along its length and/or the length of the fin may taper along its height. For example, in one embodiment, the fin may be V-shaped or form a wedge-like shape at its leading edge, thereby allowing the fin to more effectively deflect soil to the sides of the shank without disturbing surface residue. Additionally, in one embodiment, the height of the fin may be configured such that the top end of the fin is positioned at or above the soil surface while the tillage implement is disposed at its lowered or work position. By selecting the height of the fin so as to position the top end of the fin at or adjacent to the soil surface when the shank is otherwise operating at its desired penetration depth, the fin may be configured to more effectively part the soil along the entire height of the fin.

Referring now to the drawings, FIG. 1 illustrates one embodiment of a tillage implement 10 in accordance with aspects of the present subject matter. As is generally understood, the tillage implement 10 may be used to till a field to prepare the soil by plowing, ripping, turning, and/or the like. In doing so, a portion of the soil residue, such as plant stalks and/or weeds, may be removed during the tilling process. In addition, the soil may be loosened and aerated, which in turn facilitates deeper penetration of roots. The tilling process may also help in the growth of microorganisms present in the soil and thus, maintain the fertility of the soil.

As shown in FIG. 1, the tillage implement 10 includes a frame 14 and a plurality of ground-engaging tools coupled to or otherwise supported by the frame 14, such as one or more coulters, disk blades, plows, chisels, hoe openers, tillage points, rolling baskets, and/or the like. For instance, in the illustrated embodiment, the tillage implement 10 includes a plurality of coulters 16 (only one of which is shown) and a plurality of shank assemblies 100 (only one of which is shown) coupled to the frame 14 (e.g., via one or more frame members), with the shank assemblies 100 being located aft of the coulters 16 on the frame 14. The frame 14 is configured to be actuated relative to the ground 26 between a raised position (FIG. 2), at Which the ground-engaging tools are positioned above the ground surface 26A, and a lowered or working position, at which the ground-engaging tools at least partially engage the ground, by using one or more frame actuators (not shown) to adjust the position of one or more ground-engaging wheels 20 relative to the frame 14. As is generally understood, the implement 10 may be configured to be coupled to a towing vehicle, such as a tractor, using a hitch or any other suitable connecting structure.

As shown in FIG. 1, in one embodiment, each shank assembly 100 may include both a shank 102 coupled to the implement frame 14 at one end and a tillage point 104 coupled to the shank 102 at its opposed end. As is generally understood, the tillage points 104 may be configured to enable high-speed operation of the tillage implement 10 while still producing a smooth soil surface. As shown in the illustrated embodiment, when the implement frame is located at its lowered or working position, the shank assemblies 100 are positioned to till a field at a depth 24 below the field or ground surface 26A, with the depth 24 of the tillage points 104 being adjustable by raising or lowering the shank assemblies 100 and/or the portions of the frame 14 relative to the field. For example, the depth 24 may be adjusted, as desired, based on local farming practices and/or field conditions.

Figure 2:
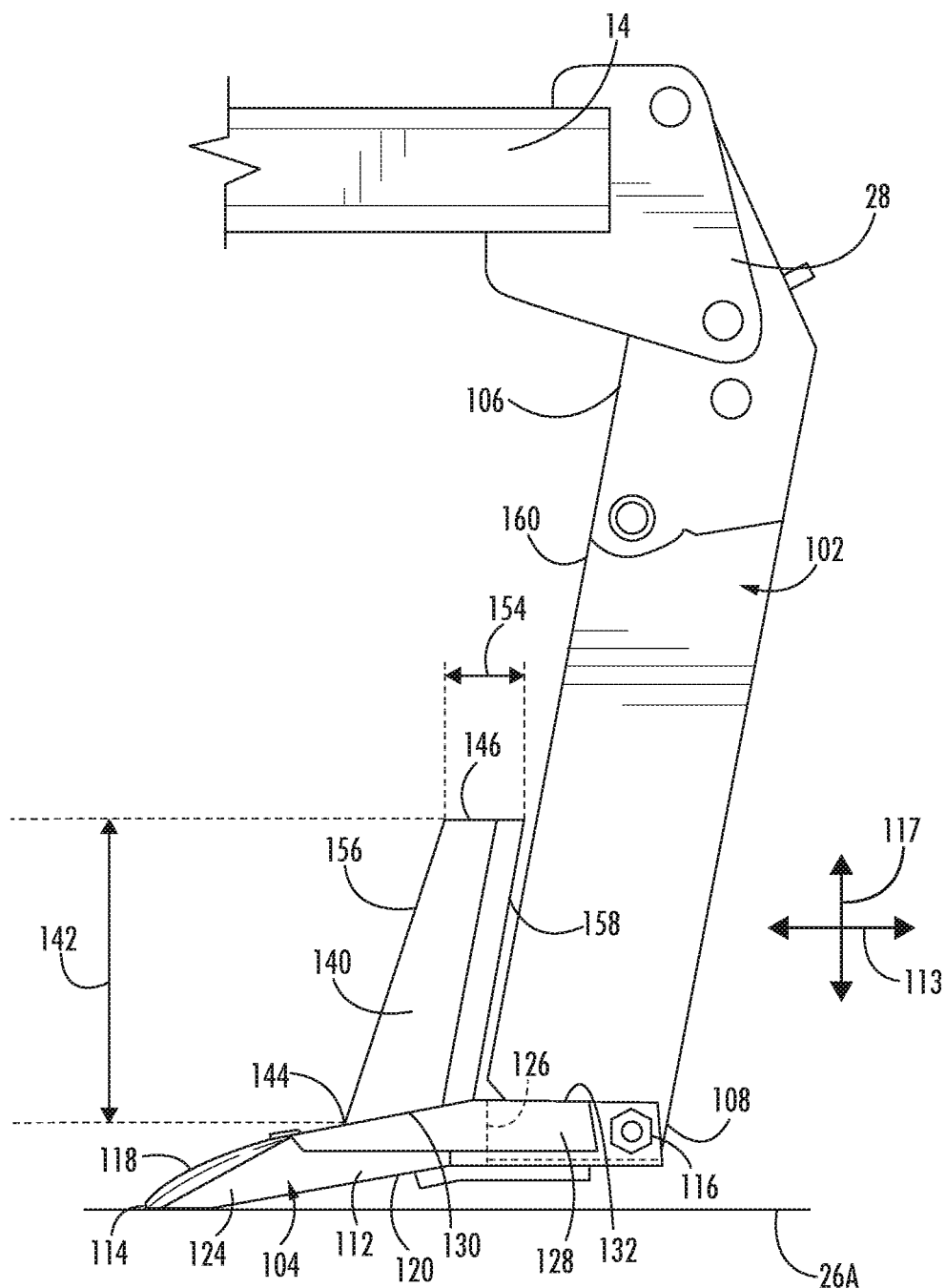
FIG. 2 illustrates a side view of a shank assembly of the agricultural implement shown in FIG. 1, particularly illustrating a tillage point including an integral dorsal fin extending vertically from the point's body adjacent to a corresponding shank in accordance with aspects of the present subject matter.
Figure 3:
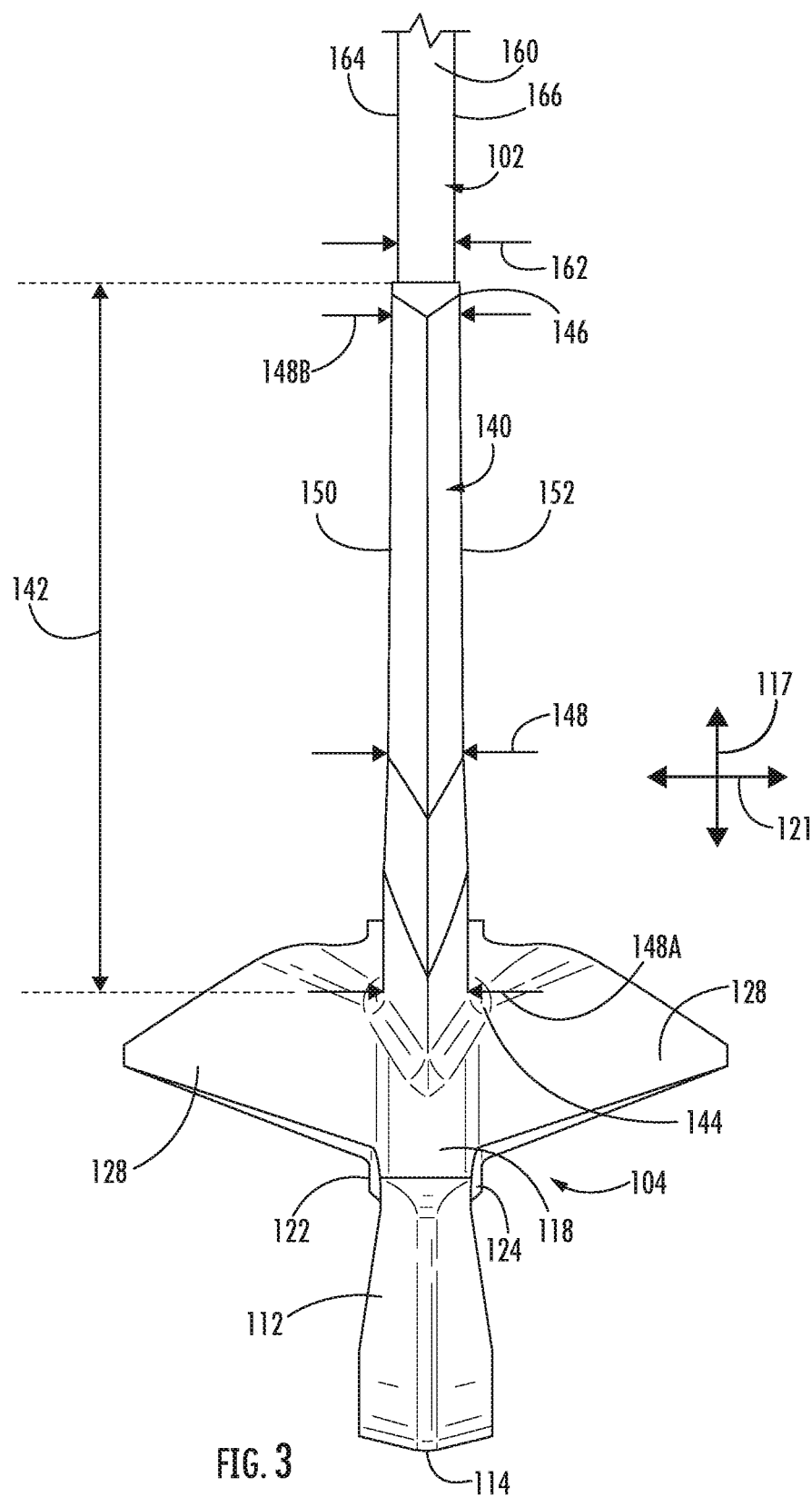
FIG. 3 illustrates a partial, front view of the shank assembly shown in FIG. 2, particularly illustrating the dorsal fin of the tillage point defining a varying lateral width in accordance with aspects of the present subject matter.
Figure 4:
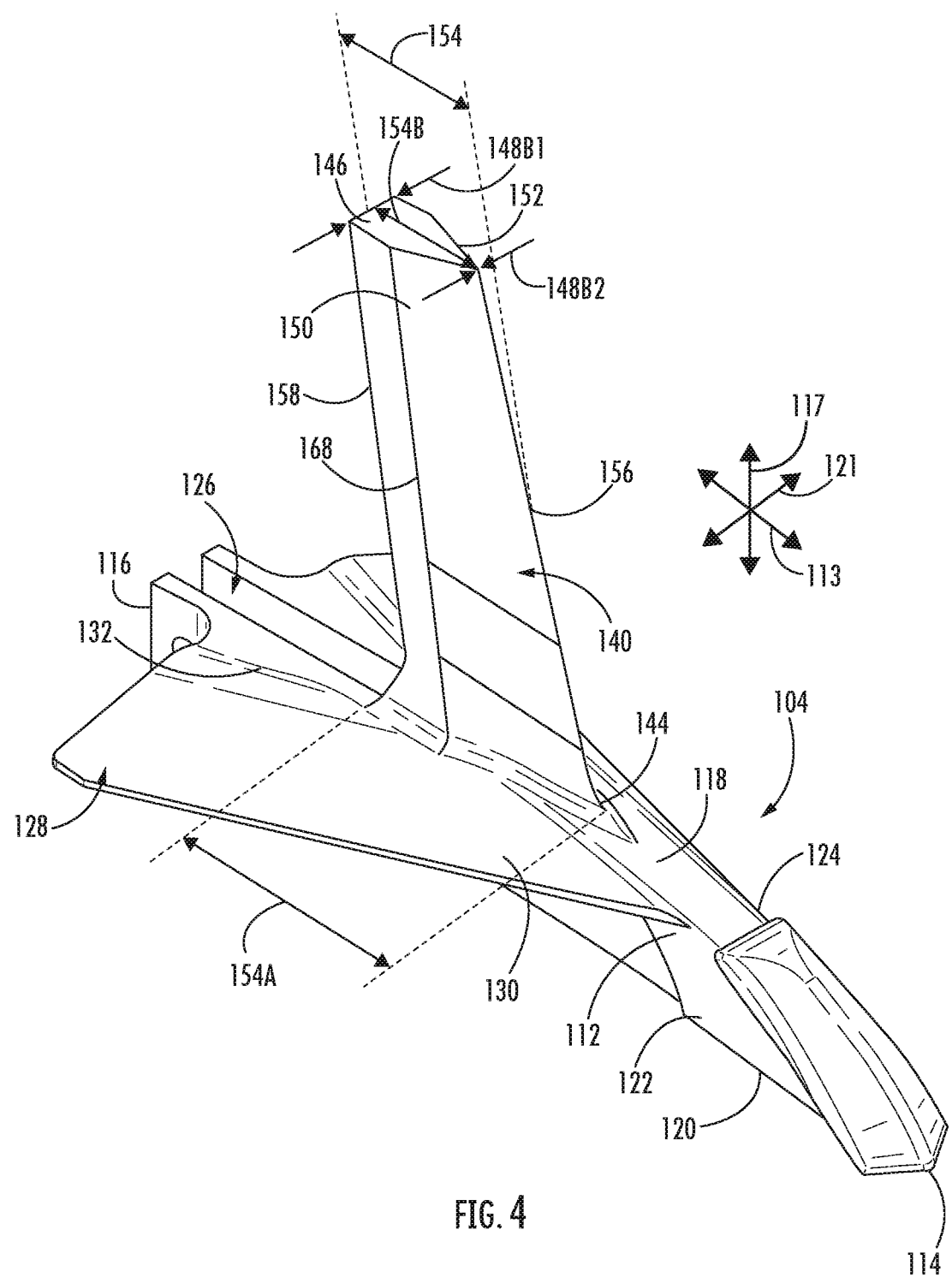
FIG. 4 illustrates a perspective view of the tillage point of the shank assembly shown in FIGS. 2 and 3 in accordance with aspects of the present subject matter.

Referring now to FIGS. 2-4, various views of one embodiment of a shank assembly 100 suitable for use with an agricultural implement (e.g., the tillage implement 10 shown in FIG. 1) is illustrated in accordance with aspects of the present subject matter. It should be appreciated that, for purposes of discussion, the shank assembly 100 shown in FIGS. 2-4 will be described as one of the shank assemblies 100 of the tillage implement 10 shown in FIG. 1. However, those of ordinary skill in the art will readily appreciate that the disclosed shank assemblies 100 may be utilized with any suitable agricultural implements having any other suitable implement configuration(s). Referring specifically to the drawings, FIG. 2 illustrates a side view of the shank assembly 100, particularly illustrating the tillage point 104 of the shank assembly 100 as installed on the corresponding shank 102. FIG. 3 illustrates a partial, front view of the shank assembly shown in FIG. 2, particularly illustrating a varying lateral profile or width of the tillage point 104 with respect to an adjacent portion of the shank 102 of the shank assembly 100. Additionally, FIG. 4 illustrates a perspective view of the tillage point 104 shown in FIGS. 2 and 3.

In general, as indicated above, the shank assembly 100 may include a shank 102 configured to be coupled to the implement frame 14 and a tillage point 104 configured to be coupled to the shank 102. For instance, the shank 102 may extend lengthwise between a proximal end 106 and a distal end 108, with the proximal end 106 being configured to be non-rotatably coupled to the implement frame 14, e.g., via a mount 28 rigidly coupled to the implement frame 14, and the distal end 108 being configured to be coupled to the tillage point 104. However, it should be appreciated that, in another embodiment, the proximal end 106 of the shank 102 may instead be rotatable or pivotally coupled to the implement frame 14.

As shown in FIGS. 2-4, the tillage point 102 may generally include a body 112 extending in a lengthwise direction of the shank assembly 100 (e.g., as indicated by arrow 113 in FIGS. 2 and 4, which may also correspond to the direction of travel of the implement 10) between a tip end 114 and an opposed retention end 116. Additionally, the body 112 may extend in a vertical direction of the shank assembly 100 (e.g., as indicated by arrow 117 in FIGS. 2-4) between a first or upper body surface 118 and a second or lower body surface 120, and in a lateral direction of the shank assembly 100 (e.g., as indicated by arrow 121 in FIGS. 3 and 4) between a first body side 122 and a second body side 124.

In general, the tip end 114 of the tillage point 104 may be configured to enable high-speed operation of the tillage implement 10, while still producing a smooth soil surface 26A. For instance, in one embodiment, the orientation of the tip end 114 of the body 112 may be angled downwardly with respect to a horizontal plane of movement of the tillage point 104 through the soil 26, which may reduce the overall amount of drag on the body 112 during operation of the implement 10. In addition, the tip end 114 of the body 112 may be substantially flat in the cross-wise or lateral direction 121 of the body 112, thereby further reducing drag on the body 112. However, in other embodiments, the tip end 114 of the tillage point 104 may have any other suitable configuration that allows the tillage point 104 to generally function as described herein. Moreover, the retention end 116 of the body 112 may generally be configured to allow the distal end 108 of the shank 102 to be coupled to the tillage point 102. For instance, in one embodiment, as is particularly shown in FIGS. 2 and 4, the body 112 includes a retention slot 126 defined at its retention end 116 between the upper and lower body surfaces 118, 120 for receiving the distal end 108 of the shank 102.

In some embodiments, the tillage point 104 may further include one or more wing sections 128 projecting outwardly from the body 112, such as generally in the lateral direction 121. More specifically, the tillage point 104 may include opposed wing sections 128 extending generally outwardly and downwardly from the first and second sides 122, 124 of the body 112, preferably adjacent to the upper body surface 118. In one embodiment, each of the wing sections 128 includes a swept-back, inclined soil lift section 130 and an upper, horizontal section 132 which is sometimes referred to as a "land section". The front or upper surface of the lift section 130 provides a soil-engaging work or "lift" surface which provides the main structure for lifting and fracturing the soil being worked behind the point and laterally of the shank. As such, the wing sections 128 of the tillage point 104 may further help to fracture the soil 26 during operation of the implement 10.

Additionally, in accordance with aspects of the present subject matter, the tillage point 104 may include a dorsal fin 140 for protecting the shank 102 during operation of the implement 10. Specifically, as is generally understood, while the tillage point 104 is being used to work the soil 26, the shank 102 is disposed below the soil surface 26A. As such, without some form of protection, the portion of the shank 102 disposed below the soil surface 26A is subject to wear. Accordingly, as will be described below, the disclosed fin 140 may be configured to extend outwardly from the body 112 so as to protect the shank 102 from wear, thereby increasing the component life of the shank 102. Moreover, the disclose fin 140 may also provide additional advantages, such as improved diversion or parting of the soil in front of the shank 102.

As shown in the illustrated embodiment, the fin 140 is configured to project vertically outwardly from the body 112 of the tillage point 104 such that the fin 140 extends generally adjacent to the shank 102 when the tillage point 104 is installed on the shank 102. As shown in FIGS. 2 and 3, the fin 140 generally extends in the vertical direction 117 between a base end 144 and a top end 146 and defines a vertical height 142 between its opposed ends 144, 146. Additionally, the fin 140 may generally extend in the lateral direction 121 between a first fin side 150 and a second fin side 152, and in the lengthwise direction 113 between a leading end 156 and a trailing end 158. As shown in FIGS. 3 and 4, the fin 140 defines a lateral width 148 (FIG. 3) between its opposed fin sides 150, 152, and a length 154 (FIG. 4) between its leading and trailing ends 156, 158. For purposes of discussion and without intent to limit, the height 142, width 148, and length 154 of the fin 140 (along with the vertical direction 117, lateral direction 121, and lengthwise direction 113, respectively) are generally defined herein as being oriented orthogonal to each other.

In the illustrated embodiment, the fin 140 is configured to extend from the upper body surface 118 of the body 112 in the vertical direction 117 along a portion of a front side 160 of the shank 102 when the point 104 is installed thereon. In such an embodiment, the fin 140 may also be configured to extend vertically towards the ground surface 26A when the frame 14 (FIG. 1) is actuated into its lowered or working position (FIG. 1). As particularly shown in FIGS. 3 and 4, the base end 144 of the fin 140 is generally positioned at the upper body surface 118 of the body 112 such that the fin 140 extends outwardly from the top side of the body 112, with the top end 146 of the fin 140 being positioned opposite the base end 144. Additionally, in one embodiment, the base end 144 of the fin 140 may generally be centered between the first and second body sides 122, 124 of the body 112 and/or between the opposed wing sections 128 in the lateral direction 121.

In several embodiments, the lateral profile or width 148 of the fin 140 may be configured so as to provide improved or enhanced protection to the shank 102 during operation of the implement. As particularly shown in FIG. 3, the shank 102 may extend in the lateral direction 121 between a first shank side 164 and a second shank side 166 and may define a lateral shank width 162 between its opposed lateral sides 164, 666. In some embodiments, the lateral width 148 of the fin 140 at its trailing end 158 is selected so as to be wider than the width 162 of the shank 102 along the entire height 142 of the fin 140, such that the front side 160 of the shank 102 and at least portions of the first and second shank sides 164, 166 are protected from eroding by the fin 140.

Further, in accordance with aspects of the present subject matter, the width 148 of the fin 140 may taper in the vertical direction 117 along at least a portion of its height 142. More specifically, as shown in FIG. 3, the fin 140 may be configured to define a tapering width 148 along its height 140 such that the lateral width 148A of the fin 140 at its base end 144 is greater than the lateral width 148B of the fin 140 at its top end 146. In such an embodiment, the amount of taper between the base and top ends 144, 146 may be selected, for example, to ensure that the width 148B of the fin 140 at its top end 146 is still being wider than the width 162 of the shank 102. Additionally, as shown in FIG. 3, the width 148 of the fin 140 may, in one embodiment, have a constant, linear taper along the entire height 142 of the fin 140. However, in other embodiments, the width 148 of the fin 140 may have a varying degree of taper along its height 142, may non-linearly taper, and/or may taper along only portion(s) of its height 142. By tapering the width 148 of the fin 140 in the manner described herein, the fin 140 is made stronger towards its base end 144 where the fin 140 meets the body 112. Thus, the fin 140 may more reliably protect the shank 102 during operation of the tillage implement 10.

Additionally, in several embodiments, the width 148 of the fin 140 may taper in the lengthwise direction 113 along at least a portion of the length 154 of the fin 140. For example, as shown in FIG. 4, the lateral width 148B1 of the fin 140 at its trailing end 158 is greater than the lateral width 148B2 of the fin 140 at its leading end 156. As such, the leading end 156 of the fin 140 may part the soil 26 more gradually than the flat front side 160 of the shank 102. Additionally, as shown in FIG. 4, the lateral width 148 of the fin 140 is tapered in the lengthwise direction 113 such that the lateral sides 150, 152 of the fin 140 converges down to a point or edge at the leading end 156 of the fin 140, thereby creating wedge-like or V-shaped profile extending aft from the leading end 156 towards the trailing end 158. In such an embodiment, the fin 140 may help to better deflect the soil 26 along the sides 150, 152 of the fin 140 and leave more residue on the soil surface 26A undisturbed.

Additionally, in some embodiments, the lateral width 148 of the fin 140 may taper along its length 154 such that ground debris is prevented from building up on the fin 140. For example, as shown in the illustrated embodiment, the width 148 of the fin 140 tapers linearly along its length 154. However, it should be appreciated that the width 148 of the fin 140 may taper along its length 154 with any other suitable taper, such as a parabolic taper. Further, in some embodiments, the width 148 of the fin 140 may, discontinuously taper along the length 154 of the fin 140. For example, as shown in FIG. 4, the width 148 of the fin 140 may be constant, with little or no taper, from the trailing end 158 to a transition portion 168 and then taper from the transition portion 168 to the leading end 156. As such, the fin 140 may have a more tapered leading end 156 to better shear the soil 26 while maintaining a strong trailing end 158 for support. Alternatively, while not shown, the width 148 of the fin 140 may continuously taper across the entire length 154 of the fin 140.

Moreover, in some embodiments, the length 154 of the fin 140 may taper in the vertical direction 117 along at least a portion of the height 142 of the fin 140. For example, as particularly shown in FIG. 4, the length of the fin 140 is tapered vertically such that the length 154A at the base end 144 of the fin 140 is greater than the length 154B at the top end 146 of the fin 140. In the embodiment shown, the length 154 of the fin 140 continuously linearly tapers along the entire height 142 of the fin 140. However, it should be appreciated that, in alternative embodiments, the length 154 of the fin 140 may instead discontinuously taper, non-linearly taper, and/or taper for only a portion of the height 142 of the fin. By tapering of the length 154 of the fin 140 along its height 142, the fin 140 is stronger where it meets the body 112, thus reducing the risk of the fin 140 breaking.

Additionally, as indicated above, the height 142 of the fin 140 may, in several embodiments, be selected so as to maximize the protection of the shank 102 during operation of the implement 10. More particularly, the height 142 of the fin 140 may be selected to be significantly greater than conventional fins such that, when the frame 14 is in its lowered position (FIG. 1), the top end 146 of the fin 140 is positioned at or above the ground surface 26A for all or a significant portion of the range of operating depths 24 at which the tillage point 104 may be operated (e.g., as shown in FIG. 1). For example, in some embodiments, the height 142 may be selected such that an overall height 142 of the tillage point 104 in the vertical direction 117 (e.g., as defined between the top end 146 of the fin 140 and the lowermost portion of the body 112) ranges from about 10 inches to about 16 inches, such as from about 11 inches to about 15 inches or from about 12 inches to about 14 inches or from about 12.5 inches to about 13.5 inches and/or any other subranges therebetween. As such, the front side 160 of the portion of the shank 102 disposed below the ground surface 26A at typical operating depths may be protected by the fin 140 against wear. In some embodiments, the fin 140 is configured with the tapered width 148 and/or the tapered length 154 along the height 142, as described above, in addition to the overall elongated height 142 of the fin 140 to strengthen the fin 140 against an increased risk of breaking due to the height increase. Thus, the elongated fin 140 eliminates the need for a separate part to protect the shank 102, which reduces the cost, time, and complexity associated with replacing parts of the shank assembly 100.

Additionally, as indicated above, the fin 140 may, in several embodiments, be formed integrally with the body 112 such that the fin 140 and the body 112 are a single piece. It should be appreciated, however, that the fin 140 may be formed separately from the body 112 and permanently fixed to the body 112, such as by welding or riveting, so that the fin 140 is still configured to be replaced with the body 112 of the tillage point 104, when necessary or desired. As such, the fin 140 may be configured to be replaced at the same time as the body 112 of the tillage point 104, reducing the cost and time associated with replacing parts of the shank assembly 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shank assembly for an agricultural implement, the shank assembly comprising:
   a shank extending lengthwise between a proximal end and a distal end, the proximal end configured to be coupled to a frame of the agricultural implement; and
   a tillage point coupled to the distal end of the shank, the tillage point including:
      a body extending vertically between an upper body surface and a lower body surface and defining a retention slot between the upper and lower body surfaces, the distal end of the shank being received within the retention slot; and
      a fin extending vertically from the body along a front side of the shank, the fin defining a vertical height between a base end of the fin positioned adjacent to the upper body surface of the body and a top end of the fin positioned opposite the base end, the fin further defining a lateral width across the front side of the shank between opposed lateral sides of the fin, the fin including a trailing end positioned near a front side of the shank and the fin is spaced apart from the shank and the fin is not in contact with the shank,
      wherein the lateral width of the fin tapers along at least a portion of the vertical height of the fin; and
      wherein the shank defines a lateral width between a first shank side and a second shank side of the shank, wherein the lateral width of the fin is greater than the lateral width of the shank across the entire height of the fin.

2. The shank assembly of claim 1, wherein the lateral width of the fin tapers as the fin extends vertically away from the body such that the lateral width at the base end is greater than the lateral width at the top end.

3. The shank assembly of claim 1, wherein the lateral width of the fin tapers along the entire height of the fin.

4. The shank assembly of claim 1, wherein the fin includes the trailing end and a leading end opposite the trailing end, the fin defining a length between the leading and trailing ends of the fin, the lateral width of the fin tapering along at least a portion of the length of the fin.

5. The shank assembly of claim 1, wherein the fin includes the trailing end and a leading end opposite the trailing end, the fin defining a length between the leading and trailing ends of the fin, the length of the fin tapers along at least a portion of the height of the fin.

6. The shank assembly of claim 1, wherein the body includes a wing positioned on each lateral side of the body, each wing having a greatest width extending away from the body positioned behind the fin and next to the retention slot for the shank.

7. An agricultural implement, the agricultural implement comprising:
   a frame configured to be actuated relative to the ground between a raised position and a lowered position;
   a shank extending lengthwise between a proximal end and a distal end, the proximal end configured to be coupled to the frame; and
   a tillage point coupled to the distal end of the shank, the tillage point including:
      a body extending vertically between an upper body surface and a lower body surface and defining a retention slot between the upper and lower body surfaces, the distal end of the shank being received within the retention slot; and
      a fin extending vertically from the body along a front side of the shank, the fin defining a vertical height between a base end of the fin positioned adjacent to the upper body surface of the body and a top end of the fin positioned opposite the base end, the fin further defining a lateral width across the front side of the shank between opposed lateral sides of the fin, the fin including a trailing end positioned near a front side of the shank and the fin is spaced apart from the shank and the fin is not in contact with the shank,
      wherein the lateral width of the fin tapers along at least a portion of the vertical height of the fin; and wherein the shank defines a lateral width between a first shank side and a second shank side of the shank, the lateral width of the fin being greater than the lateral width of the shank across the entire vertical height of the fin.

8. The agricultural implement of claim 7, wherein the lateral width of the fin tapers as the fin extends away from the body such that the lateral width at the base end is greater than the lateral width at the top end.

9. The agricultural implement of claim 7, wherein the body includes a wing positioned on each lateral side of the body, the wing having a greatest width extending away from the body and positioned behind the fin and next to the retention slot for the shank.

10. The agricultural implement of claim 7, wherein the top end of the fin is configured to extend above the ground when the frame is in the lowered position.

11. The agricultural implement of claim 7, wherein the fin has a length defined between a leading end and the trailing end, the lateral width of the fin tapering along at least a portion of the length of the fin.

* * * * *